(12) United States Patent
Lee et al.

(10) Patent No.: US 12,052,499 B2
(45) Date of Patent: Jul. 30, 2024

(54) IMAGE STABILIZING COIL MEMBER AND CAMERA MODULE COMPRISING SAME

(71) Applicant: LG INNOTEK CO., LTD., Seoul (KR)

(72) Inventors: Seung Jin Lee, Seoul (KR); Hyung Kyu Yoon, Seoul (KR); Hye Yeong Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 219 days.

(21) Appl. No.: 17/634,291

(22) PCT Filed: Jul. 28, 2020

(86) PCT No.: PCT/KR2020/009893
§ 371 (c)(1),
(2) Date: Feb. 10, 2022

(87) PCT Pub. No.: WO2021/029571
PCT Pub. Date: Feb. 18, 2021

(65) Prior Publication Data
US 2022/0294959 A1    Sep. 15, 2022

(30) Foreign Application Priority Data
Aug. 13, 2019 (KR) .......... 10-2019-0098972

(51) Int. Cl.
*H04N 23/68* (2023.01)
*G02B 27/64* (2006.01)
(Continued)

(52) U.S. Cl.
CPC ......... *H04N 23/685* (2023.01); *G02B 27/646* (2013.01); *G03B 5/02* (2013.01);
(Continued)

(58) Field of Classification Search
CPC ........ H04N 23/50; H04N 23/51; H04N 23/54; H04N 23/55; H04N 23/57; H04N 23/685;
(Continued)

(56) References Cited

U.S. PATENT DOCUMENTS 10,340,073 B2    7/2019   Lee et al.
10,514,800 B2 *  12/2019  Jo .......................... G06F 3/046
(Continued)

FOREIGN PATENT DOCUMENTS

KR    10-2017-0015103    2/2017
KR    10-2017-0036347    4/2017
(Continued)

OTHER PUBLICATIONS

International Search Report dated Nov. 13, 2020 issued in Application No. PCT/KR2020/009893.

*Primary Examiner* — Twyler L Haskins
*Assistant Examiner* — Akshay Trehan
(74) *Attorney, Agent, or Firm* — KED & ASSOCIATES, LLP

(57) ABSTRACT

A coil member according to an embodiment comprises: a substrate including an upper surface and a lower surface opposite to the upper surface; a first coil electrode disposed on the upper surface of the substrate and including first pattern electrodes; a second coil electrode disposed on the lower surface of the substrate and including second pattern electrodes; and third pattern electrodes disposed on the upper surface and the lower surface of the substrate, wherein a distance between the first pattern electrodes is different from a distance between the first pattern electrodes and the third pattern electrodes, and a distance between the second pattern electrodes is different from a distance between the second pattern electrodes and the third pattern electrodes.

18 Claims, 8 Drawing Sheets

(51) Int. Cl.
  *G03B 5/02*  (2021.01)
  *G03B 17/02*  (2021.01)
  *H02K 3/26*  (2006.01)
  *H02K 11/00*  (2016.01)
  *H02K 41/035*  (2006.01)
  *H04N 23/54*  (2023.01)

(52) U.S. Cl.
  CPC ............... *G03B 17/02* (2013.01); *H02K 3/26* (2013.01); *H02K 11/0094* (2013.01); *H02K 41/0356* (2013.01); *H04N 23/54* (2023.01); *G03B 2205/0007* (2013.01)

(58) Field of Classification Search
  CPC .... H04N 23/687; G02B 27/64; G02B 27/646; G03B 5/02; G03B 5/04; G03B 17/02; G03B 2205/0007; G03B 2205/0015; G03B 2205/0038; G03B 2205/0053; G03B 2205/0069; H02K 41/0354; H02K 41/0356; H02K 3/26; H02K 11/0094
  See application file for complete search history.

(56) References Cited

U.S. PATENT DOCUMENTS

2017/0139525 A1\* 5/2017 Jo ........................ H10K 59/40
2017/0330674 A1\* 11/2017 Lee ..................... H01F 17/0013
2020/0200994 A1\* 6/2020 Park ..................... H04N 23/687

FOREIGN PATENT DOCUMENTS

| KR | 10-2017-0056798 | 5/2017 | | |
| KR | 10-2018-0071443 | 6/2018 | | |
| KR | 20180071443 A | * 6/2018 | ............ | H01F 41/04 |
| KR | 10-2018-0111004 | 10/2018 | | |
| KR | 10-2018-0126918 | 11/2018 | | |

\* cited by examiner

[FIG. 1]
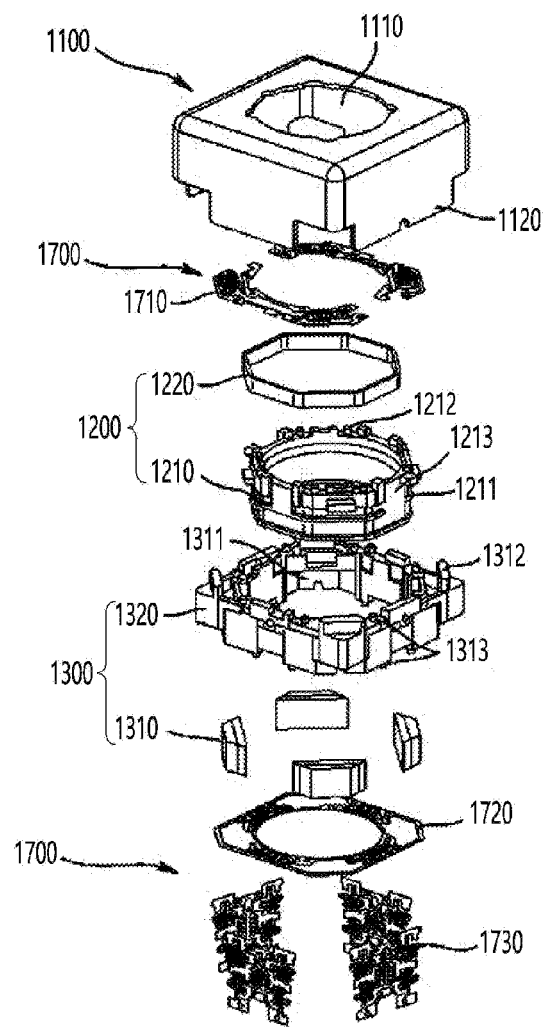
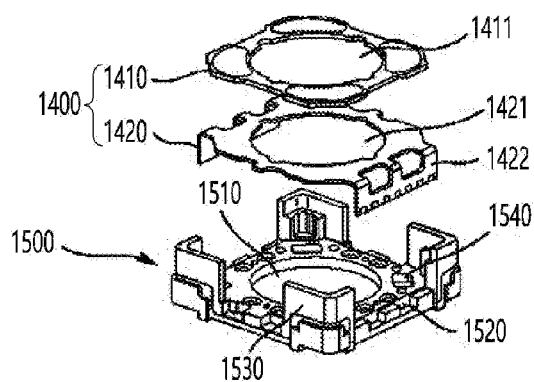

[FIG. 2]
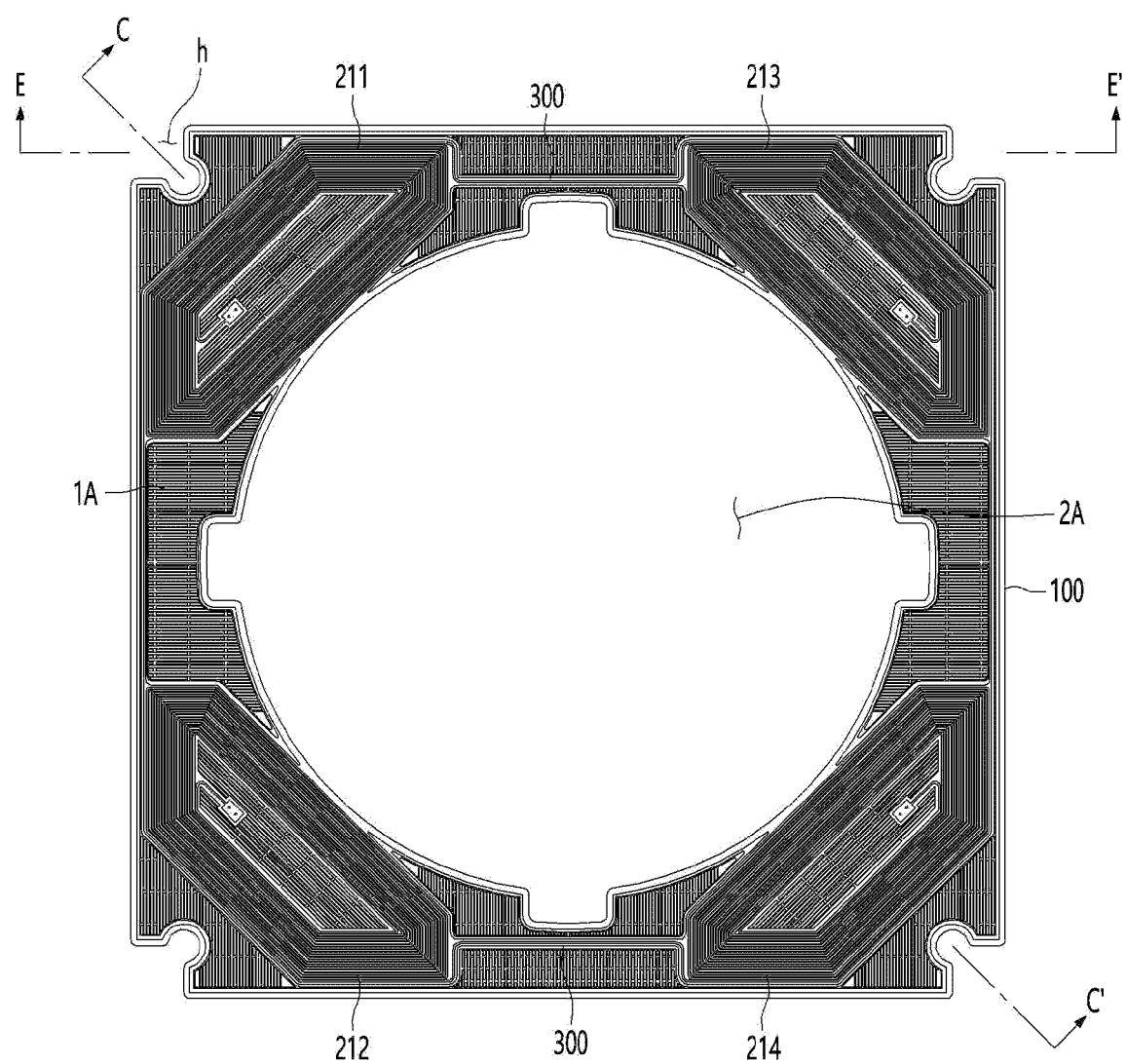

[FIG. 3]
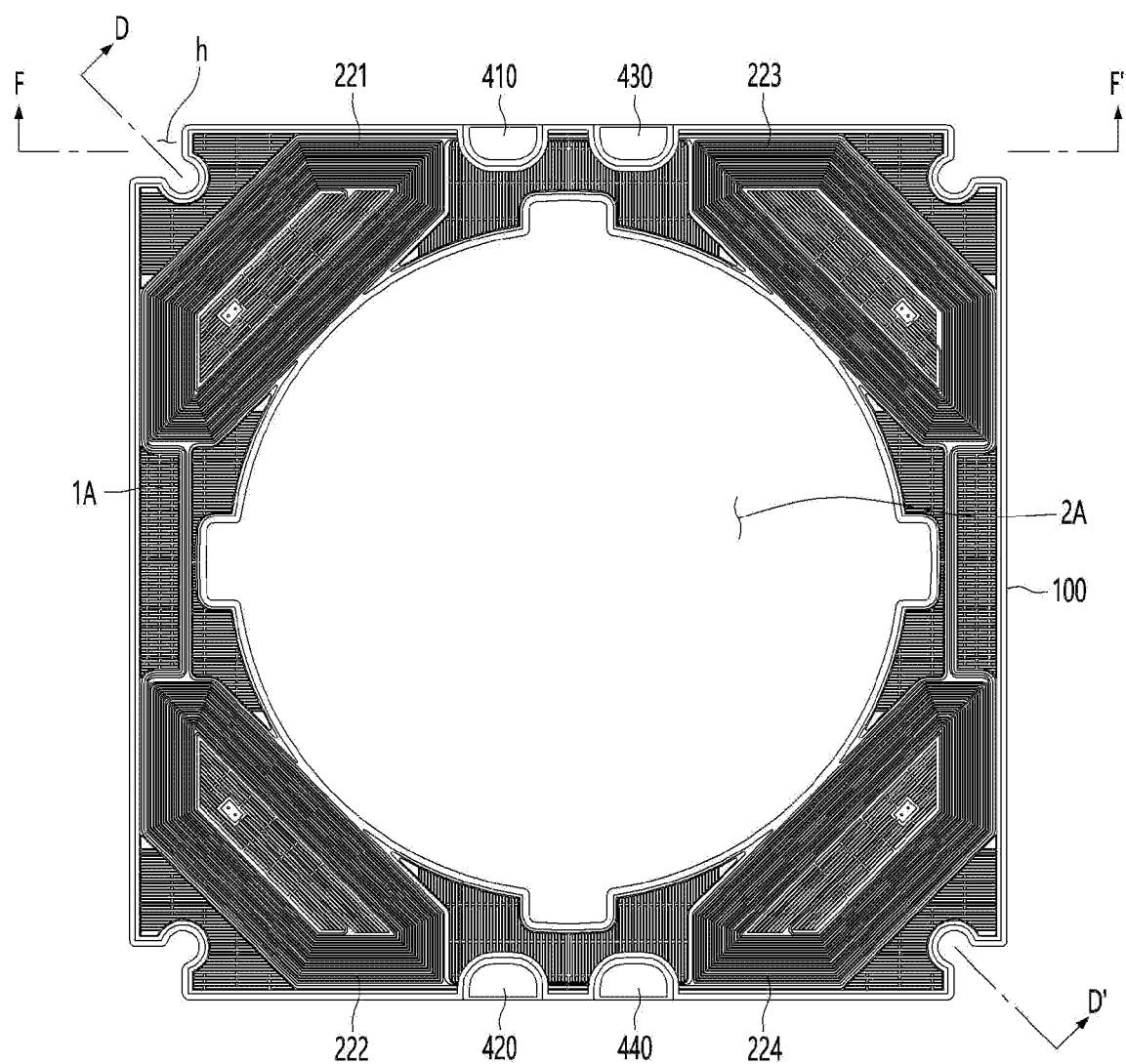

[FIG. 4]
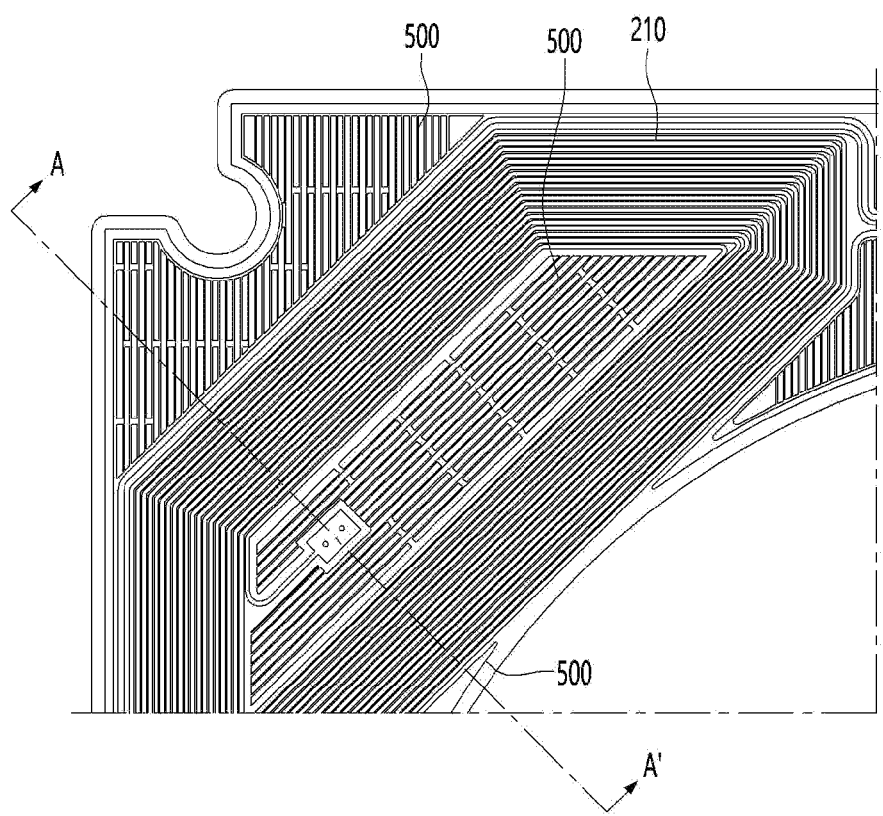

[FIG. 5]
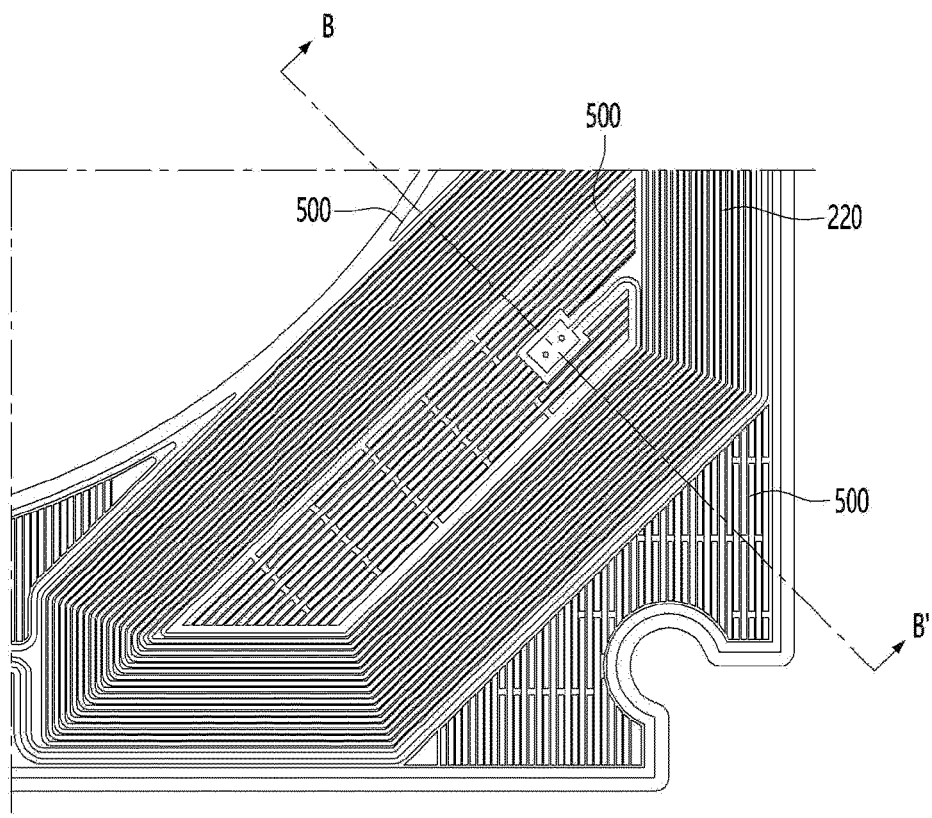
[FIG. 6]
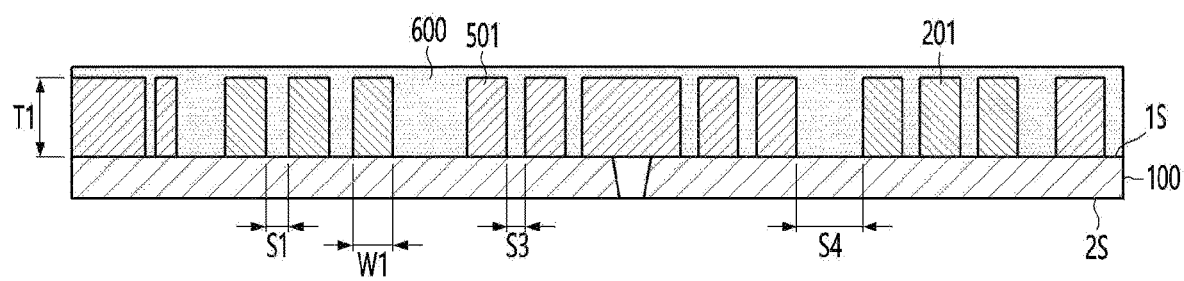

【FIG. 7】
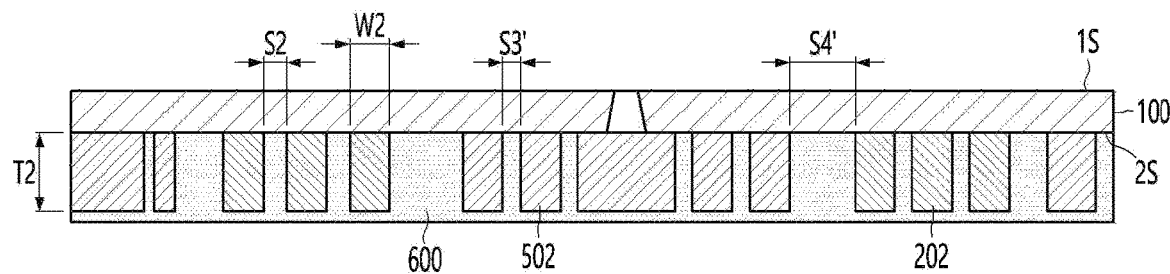
【FIG. 8】
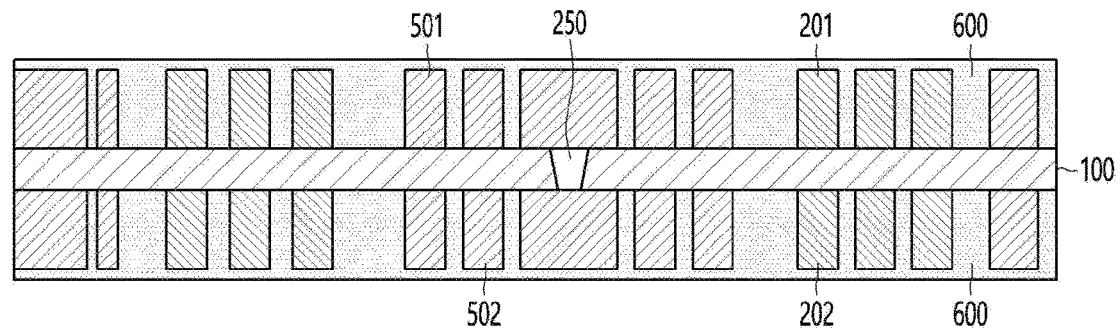
【FIG. 9】
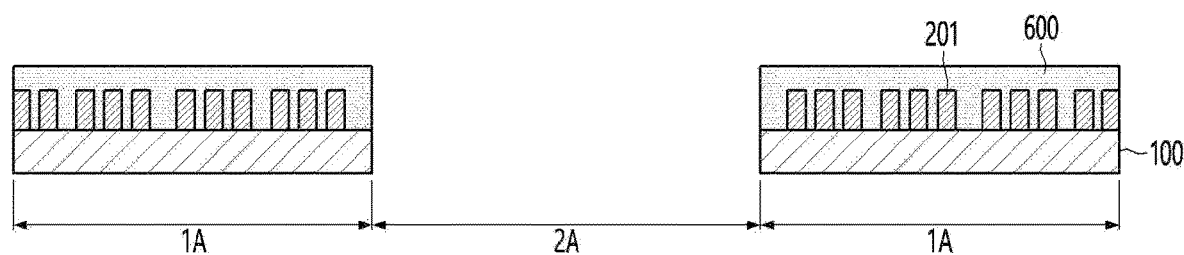

[FIG. 10]
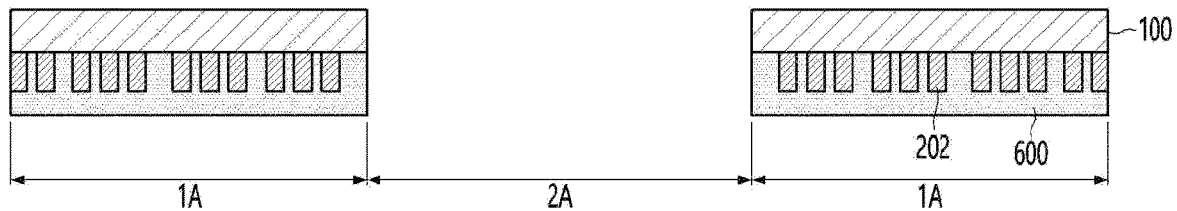
[FIG. 11]
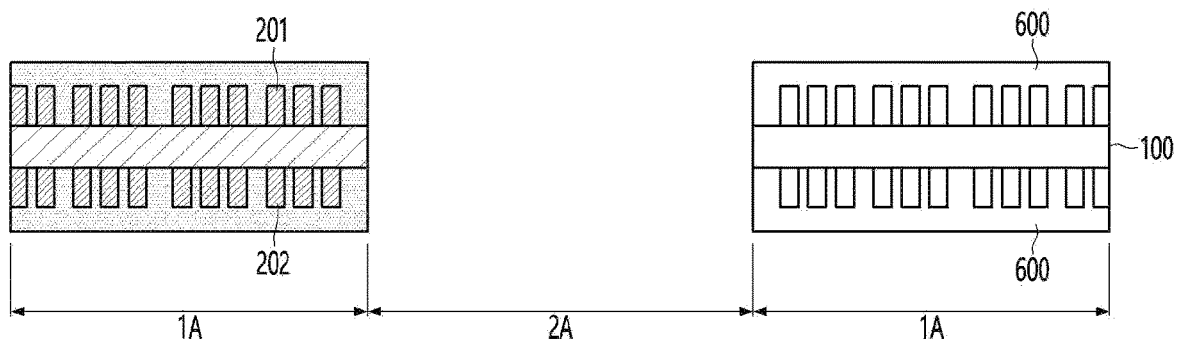
[FIG. 12]
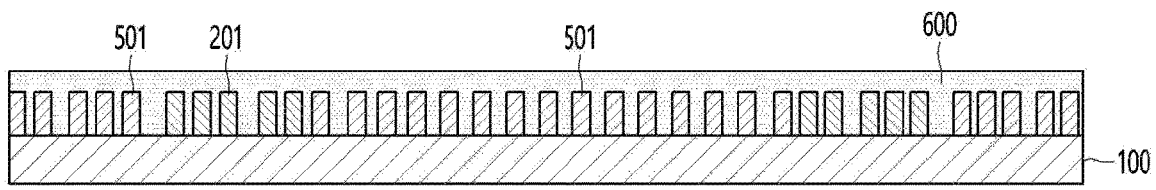
[FIG. 13]
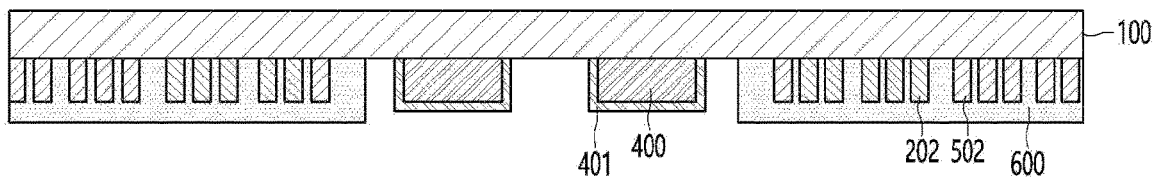

[FIG. 14]
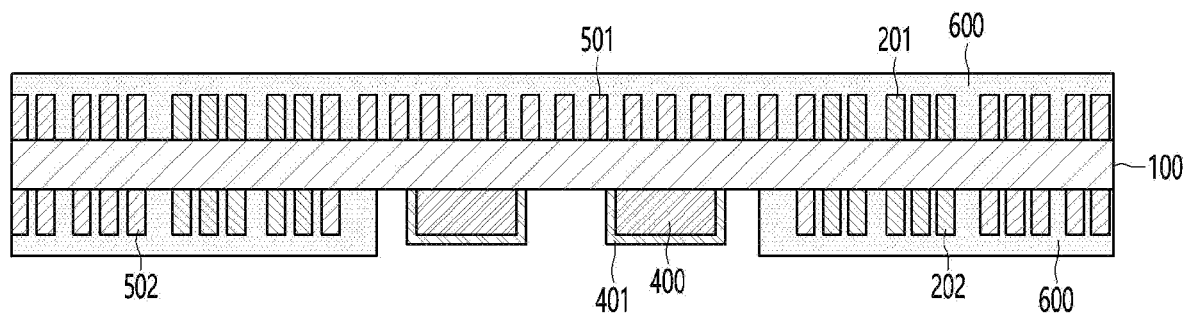

IMAGE STABILIZING COIL MEMBER AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2020/009893, filed Jul. 28, 2020, which claims priority to Korean Patent Application No. 10-2019-0098972, filed Aug. 13, 2019, whose entire disclosures are hereby incorporated by reference.

TECHNICAL FIELD

Embodiments relate to a coil member for image stabilization and camera module including the same.

BACKGROUND ART

As various portable terminals are widely used and the wireless Internet service is commercialized, needs of consumers related to the portable terminals are diversified, and accordingly, various kinds of additional devices are installed in the portable terminals.

A representative one of them is a camera module that may photograph a subject in a photograph or a moving image, store the image data, and then edit and transmit the image data as needed.

In recent years, there has been an increasing demand for small camera modules for use in various multimedia fields such as note type personal computers, camera phones, PDAs, smart devices, toys, etc., and for image input devices such as surveillance cameras and information terminals of video tape recorders.

Conventional camera modules are roughly classified into fixed focus (F.F) type, auto focus (A.F) type, and optical image stabilization (OIS) type camera modules.

Meanwhile, in the case of the OIS type, a coil pattern disposed on a circuit board may be included as a component for realizing a camera shake prevention function. In this case, resistance of the coil pattern should be reduced in order to control electromotive force generated in the coil pattern, and the coil pattern should have a predetermined line width and thickness in order to reduce such resistance.

Therefore, when the coil pattern is formed so as to have a predetermined line width and a high thickness, reliability problems such as pattern collapse may occur due to the thickness of the coil pattern.

Therefore, there is a demand for a coil pattern having improved reliability and a camera module including the coil pattern.

DISCLOSURE

Technical Problem

An embodiment is directed to providing a camera module having improved characteristics and reliability.

Technical Solution

A coil member according to an embodiment includes: a substrate including an upper surface and a lower surface opposite to the upper surface; a first coil electrode disposed on the upper surface of the substrate and including a first pattern electrode; a second coil electrode disposed on the lower surface of the substrate and including a second pattern electrode; and a third pattern electrode disposed on the upper and lower surfaces of the substrate, wherein a distance between the first pattern electrodes and a distance between the first pattern electrode and the third pattern electrode are different from each other, and a distance between the second pattern electrodes and a distance between the second pattern electrode and the third pattern electrode are different from each other.

Advantageous Effects

A coil member according to an embodiment may include a dummy electrode together with a coil electrode that generates electromotive force.

Accordingly, when plating and patterning the coil electrode, a thickness of each of coil electrode patterns may be uniformly formed. That is, the plating thickness of the coil electrode patterns may be uniform by forming a thickness of a region to be plated in a region of a substrate uniform.

In addition, a distance between the coil electrode pattern and a dummy electrode pattern may be controlled within a predetermined range. Accordingly, dummy electrode patterns may be stably formed, so that the plating thickness of the coil electrode patterns may be uniform by the dummy electrode patterns.

Therefore, it is possible to sufficiently secure the thickness of the coil pattern of the coil member that serves to prevent camera shake of a camera module according to an embodiment, so that it is possible to reduce resistance of the coil member, and accordingly, it is possible to sufficiently generate the electromotive force of the coil member, thereby improving characteristics of the coil member and anti-shake characteristics of the camera module including the same.

DESCRIPTION OF DRAWINGS

FIG. 1 a perspective view of a camera module according to an embodiment.

FIG. 2 is a top view of a coil member according to an embodiment.

FIG. 3 is a bottom view of the coil member according to the embodiment.

FIG. 4 is an enlarged view of a region in FIG. 2.

FIG. 5 is an enlarged view of a region in FIG. 3.

FIG. 6 is a cross-sectional view taken along line A-A' in FIG. 4.

FIG. 7 is a cross-sectional view taken along line B-B' in FIG. 5.

FIG. 8 is a cross-sectional view of a coil member according to an embodiment.

FIG. 9 is a cross-sectional view taken along line C-C' in FIG. 2.

FIG. 10 is a cross-sectional view taken along line D-D' in FIG. 3.

FIG. 11 is a cross-sectional view of a coil member according to an embodiment.

FIG. 12 is a cross-sectional view taken along line E-E' in FIG. 2.

FIG. 13 is a cross-sectional view taken along line F-F' in FIG. 3.

FIG. 14 is a cross-sectional view of a coil member according to an embodiment.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which the present invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a coil member according to an embodiment and a camera module including the same will be described with reference to the drawings.

FIG. 1 is a view showing a combined perspective view of a camera module according to an embodiment. FIG. 2 is an exploded perspective view of the camera module according to the embodiment.

Referring to FIG. 1, a camera module 1000 according to the embodiment includes a cover can 1100, a first mover 1200, a second mover 1300, a stator 1400, a base 1500, and an elastic unit 1600. In addition, although not shown in FIG. 1, the camera module 1000 according to the embodiment may further include a printed circuit board, an IR filter, an image sensor, and the like.

The cover can 1100 accommodates the elastic unit 1600, the first mover 1200, the stator 1400, and the second mover 1300 and is mounted on the base 1500 to form an exterior of a lens driving motor. Specifically, an inner surface of the cover can 1100 is in close contact with some or all of side surfaces of the base 1500 to be mounted on the base 1500, and the cover can 1100 has a function of protecting internal components from external impacts and preventing penetration of external contaminants.

In addition, the cover can 1100 should also perform a function of protecting the lens driving motor or the components of the camera module from external radio wave interference generated by a mobile phone or the like. Therefore, the cover can 1100 is preferably formed of a metal material.

The cover can 1100 may be implemented as a yoke unit itself, which will be described below, or may be fixed by molding the yoke unit on the inside thereof. In addition, an opening 1110 through which a lens unit (not shown) is exposed may be formed on an upper surface of the cover can 1100, and an inner yoke (not shown) bent inside the cover can 1100 may be formed at a lower end portion of the upper surface of the cover can 1100. This inner yoke may be positioned in a concave portion 1213 formed in the bobbin 1210. In this case, the inner yoke may be disposed at a corner around the opening on an upper surface of the yoke portion or may be disposed on a side surface of the yoke portion, and the concave portion of the bobbin may be formed at a corresponding position.

In addition, the cover can 1100 may have a fastening piece 1120 formed so as to extend at least one on each surface of the lower end portion thereof, and it is possible to implement a more robust sealing function and fastening function of the lens driving motor by forming a fastening groove 1520 into which the fastening piece 1120 is inserted in the base 1500. In addition, the fastening piece and the fastening groove may not be separately present, and only one of the two may be formed.

Meanwhile, the first mover 1200 is disposed on a side surface of the lens unit in order to move the lens unit (not shown). The first mover 1200 includes the bobbin 1210 for fixing the lens unit and a first coil part 1220 provided on an outer circumferential surface of the bobbin 1210.

The lens unit (not shown) may be a lens barrel provided with one or more lenses (not shown), but the embodiment is not limited thereto, and any holder structure capable of supporting the lens may be included.

An inner circumferential surface of the bobbin 1210 is coupled to an outer circumferential surface of the lens unit to fix the lens unit. In addition, the bobbin 1210 may have a guide part 1211, which guides the winding or mounting of the first coil part 1220, on an outer circumferential surface thereof. The guide part 1211 may be integrally formed with an outer surface of the bobbin 1210, and may be formed continuously along the outer surface of the bobbin 1210 or may be formed to be spaced apart at a predetermined distance.

In addition, a spring fastening protrusion 1212, to which an upper spring 1710 or a lower spring 1720 provided on the upper side of the base 1500 to support the bobbin 1210 is fastened, may be formed on the upper and lower surfaces of the bobbin 1210.

In addition, the bobbin 1210 may further include a concave portion 1213 formed on the outer circumferential surface thereof so that the inner yoke of the cover can 1100 may be positioned between the bobbin 1210 and the first coil part 1220 wound around the bobbin 1210.

In addition, the first coil part 1220 may be guided by the guide part 1211 and wound on the outer surface of the bobbin 1210, but four individual coils may be formed on the outer surface of the bobbin 1210 at 90° intervals. The first coil part 1220 may receive power applied from a printed circuit board (not shown) to be described later to form an electromagnetic field.

Meanwhile, the second mover 1300 may be positioned to face the first mover 1200 on a side surface of the first mover

1200 and may include a magnet part 1310 disposed so as to face the first coil part 1220 and a housing 1320 to which the magnet part 1310 is fixed.

Specifically, the magnet part 1310 may be mounted to the housing 1320 by an adhesive or the like so as to be disposed at a position corresponding to an outer surface of the first coil part 1220 and may be mounted on four corners inside the housing 1320 at equivalent intervals to promote efficient use of the internal volume.

The housing 1320 may be formed in a shape corresponding to an inner surface of the cover can 1100 forming the exterior of the lens driving motor. In addition, the housing 1320 may be formed of an insulating material and may be made as an injection molding product in consideration of productivity. The housing 1320 may be a moving part for OIS driving and may be disposed to be spaced apart from the cover can 1100 by a predetermined distance.

In the embodiment, the housing 1320 may be formed in a hexahedral shape to be spaced apart by a predetermined distance corresponding to a shape of the cover can 1100, and upper and lower sides of the housing 1320 may be opened to support the first mover 1200. In addition, the housing 1320 may include a magnet part fastening hole 1311 or a magnet part fastening groove formed in a shape corresponding to the magnet part 1310 on a side surface thereof.

In addition, at least two stoppers 1312 that are formed to protrude at a predetermined distance from an upper surface of the housing 1320 to be in contact with the upper surface of the cover can 1100 to enable to absorb an external impact may be formed. The stopper 1312 may be formed integrally with the housing 1320.

In addition, a spring fastening protrusion 1313 to which the upper spring 1710 or the lower spring 1720 provided on the upper side of the base 1500 to be described later so as to support the housing 1320 is fastened may be formed on the upper and lower surfaces of the housing 1320.

Meanwhile, the stator 1400 is positioned to face a lower side of the second mover 1300 in order to move the second mover 1300 and has through-holes 1411 and 1421 corresponding to the lens unit that are formed in a center thereof.

Specifically, the stator 1400 may include a second coil part 1410 positioned so as to face a lower side of the magnet part 1310 and a substrate on which the second coil part 1410 is disposed on the upper side to apply power, and an OIS chip is mounted, and the substrate may be a flexible printed circuit board 1420.

The second coil part 1410 may be mounted on the flexible printed circuit board 1420 provided on the upper side of the base 1500 or formed on a flexible printed circuit board or a substrate, and the through-hole 1411 is formed in the center in order to pass a light signal of the lens unit (not shown). Meanwhile, when considering the miniaturization of the lens driving motor, specifically, lowering the height in a z-axis direction, which is an optical axis direction, the second coil part 1410 may be formed as a fine pattern (FP) coil that is a patterned coil and disposed on the flexible printed circuit board.

The pattern coil of the second coil part 1410 may be formed to have a predetermined thickness or more in order to control the electromotive force of the pattern coil. That is, the pattern coil may have a fine line width and be formed to have a predetermined thickness or more, thereby reducing resistance of the pattern coil. In this case, a dry film photoresist (DFR) pattern may collapse due to the thickness of the pattern coil during a pattern formation process, and thus there is a problem that the reliability of the pattern coil is deteriorated.

Therefore, in the pattern coil according to the embodiment, in order to solve such a reliability problem, a dummy electrode may be disposed together with the pattern coil. The pattern coil and the dummy electrode will be described in detail below.

The flexible printed circuit board 1420 may be provided on an upper surface of the base 1500 to apply power to the second coil part 1410, and the through-hole 1421 corresponding to the through-hole 1411 of the second coil part 1410 is formed on the flexible printed circuit board (FPCB) 1420. In addition, the FPCB 1420 may include a terminal portion 1422 having one end or both ends facing each other bent to protrude to the lower side of the base 1500 and may be supplied with external power through the terminal portion 1422.

In addition, the embodiment may further include a hall sensor unit (not shown) mounted on a lower or upper surface of the FPCB 1420 so as to correspond to a position of the magnet part 1310.

The hall sensor unit senses an intensity and phase of a voltage applied to detect the movement of the magnet part 1310 and a current flowing through the coil and interacts with the FPCB 1420 to be provided in order to precisely control the actuator.

The hall sensor unit may be provided on a straight line based on the magnet part 1310 and the optical axis direction, and since the hall sensor unit has to detect displacements in the x-axis and y-axis, the hall sensor unit may include two hall sensors respectively provided at adjacent two corners among corners of the FPCB 1420. A hall sensor receiving groove 1540 capable of accommodating the hall sensor may be formed in the base 1500. In addition, the hall sensor may be provided with one or more.

Although the hall sensor unit is provided closer to the second coil part 1410 than the magnet part 1310, considering that the strength of the magnetic field formed in the magnet part is several hundred times greater than the strength of the electromagnetic field formed in the coil, the influence of the second coil part 1410 in detecting the movement of the magnet part 1310 is not considered.

The lens unit is moved in all directions by the independent or organic interaction of the first mover 1200, the second mover 1300, and the stator 1400, so that the image focus of a subject is focused through the interaction of the first mover 1200 and the second mover 1300, and a camera shake and the like may be corrected by the interaction of the second mover 1300 and the stator 1400.

Meanwhile, the base 1500 supports the stator 1400 and the second mover 1300, and a hollow hole 1510 corresponding to the through-holes 1411 and 1421 is formed in a center thereof.

The base 1500 may function as a sensor holder to protect an image sensor (not shown) and may be provided to position an IR filter (not shown) at the same time. In this case, the IR filter may be mounted in the hollow hole 1510 formed in the center of the base 1500, and an infrared ray (IR) filter may be provided. In addition, the IR filter may be formed of, for example, a film material or a glass material, and an infrared blocking coating material may be disposed on a plate-shaped optical filter such as a cover glass for protecting an imaging surface, a cover glass, or the like. In addition, a separate sensor holder may be positioned under the base in addition to the base.

In addition, the base 1500 may be formed with one or more fixing protrusions 1530 protruding from an upper corner to face or couple to the inner surface of the cover can 1100, and such a fixing protrusion 1530 may easily guide fastening of the cover can 1100 and may achieve firm fixation after fastening. In addition, two or more fixing protrusions may be formed.

In addition, the base 1500 may have the fastening groove 1520 into which the fastening piece 1120 of the cover can 1100 is inserted. The fastening groove 1520 may be formed locally on an outer surface of the base 1500 in a shape corresponding to a length of the fastening piece 1120 or may be formed entirely on the outer surface of the base 1500 so that a predetermined part of the lower end portion of the cover can 1100 including the fastening piece 1120 is inserted.

Hereinafter, the second coil part 1410 described above will be described in detail with reference to FIGS. 2 to 14.

The second coil part 1410 may be defined as a coil member including a substrate 100 and a coil electrode 210 and a dummy electrode 500 disposed on the substrate 100. The coil member may be disposed on the flexible printed circuit board 1420 described above.

FIGS. 2 and 3 are a top view and a bottom view of a coil member according to an embodiment. In addition, FIG. 4 is a view showing a region of the top view of the coil member according to the embodiment, and FIG. 5 is a view showing a region of the bottom view of the coil member according to the embodiment.

Referring to FIGS. 2 to 4, the coil member may include the substrate 100 and coil electrodes 210 and 220 disposed on upper and lower surfaces of the substrate 100.

The substrate 100 may include a curved surface. In detail, the inside of the substrate 100 may include a curved surface.

The substrate 100 may include a first region 1A and a second region 2A. In detail, the substrate 100 may include the first region 1A in which the coil electrodes 210 and 220 and the dummy electrode 500 are disposed and the second region 2A in which the coil electrode 120 is not disposed.

The first region 1A may be defined as upper surface and the other surface regions of the substrate 100. In addition, the second region 2A may be defined as a hole region passing through the upper surface and the other surface of the substrate 100.

The hole in the second region 2A may be a region corresponding to the through-hole 1421 described above. That is, in the substrate 100, the second region 2A correspond to the lens unit and passing through the substrate 100 may be formed in a center thereof.

In addition, the first region 1A may be formed in a shape surrounding the second region 2A. A plurality of coupling holes h may be formed in the first region 1A for coupling with a FPCB disposed under the coil member. In detail, the plurality of coupling holes h coupled to the FPCB disposed under the coil member may be formed in a corner region of the substrate 100.

The substrate 100 may be a flexible substrate. That is, the substrate 100 may include a flexible plastic. For example, the substrate 100 may be a polyimide (PI) substrate. However, the embodiment is not limited thereto, and the substrate 100 may be a substrate made of a polymer material such as polyethylene terephthalate (PET) or polyethylene naphthalate (PEN). Accordingly, a flexible circuit board including the substrate 100 may be used for various electronic devices provided with a curved display device.

The substrate 100 may be an insulating substrate. That is, the substrate 100 may be the insulating substrate supporting various wiring patterns.

The substrate 100 may have a thickness of 20 μm to 100 μm. For example, the substrate 100 may have a thickness of 25 μm to 50 μm. For example, the substrate 100 may have a thickness of 30 μm to 40 μm. When the thickness of the substrate 100 exceeds 100 μm, the overall thickness of the coil member may increase. In addition, when the thickness of the substrate 100 is less than 20 μm, the substrate 100 may be vulnerable to heat, pressure, or the like in a process of forming a coil electrode of the substrate 100.

Referring to FIGS. 2 to 4, a coil electrode 200 may be disposed on the substrate 100. In detail, referring to FIG. 2, a plurality of first coil electrodes 210 may be disposed on the upper surface of the substrate 100. In addition, referring to FIG. 3, a plurality of second coil electrodes 220 may be disposed on the lower surface of the substrate 100.

The first coil electrode 210 may include a plurality of first pattern electrodes spaced apart from each other. In addition, the second coil electrode 220 may include a plurality of second pattern electrodes spaced apart from each other.

Referring to FIG. 2, four first coil electrodes 210 may be disposed on the upper surface of the substrate 100. In detail, the plurality of first coil electrodes 210 may be disposed to be spaced apart from each other in a region corresponding to the corner region of the substrate 100 on the upper surface of the substrate 100. That is, each of the first coil electrodes 210 may be disposed on a region corresponding to each of the coupling holes h.

In detail, a 1-1 coil electrode 211, a 1-2 coil electrode 212, a 1-3 coil electrode 213, and a 1-4 coil electrode 214 may be provided on the upper surface of the substrate 100.

The 1-1 coil electrode 211, the 1-2 coil electrode 212, the 1-3 coil electrode 213, and the 1-4 coil electrode 214 may be disposed to be spaced apart from each other on the upper surface of the substrate 100.

The plurality of first coil electrodes 210 may be disposed in two pairs facing each other. For example, the 1-1 coil electrode 211 and the 1-4 coil electrode 214 may be disposed to face each other, and the 1-2 coil electrode 212 and the 1-3 coil electrode The 213 may be disposed to face each other.

The 1-1 coil electrode 211 and the 1-4 coil electrode 214 may be connected to each other through a connection electrode 300 connected to the 1-1 coil electrode 211 and the 1-4 coil electrode 214. Further, the 1-2 coil electrode 212 and the 1-3 coil electrode 213 may be electrically connected to each other through the connection electrode 300 connected to the 1-2 coil electrode 212 and the 1-3 coil electrode 213.

In addition, referring to FIG. 3, four second coil electrodes 220 may be disposed on the lower surface of the substrate 100. In detail, a 2-1 coil electrode 221, a 2-2 coil electrode 222, a 2-3 coil electrode 223, and a 2-4 coil electrode 224 may be provided on the lower surface of the substrate 100.

The 2-1 coil electrode 221, the 2-2 coil electrode 222, the 2-3 coil electrode 223, and the 2-4 coil electrode 224 may be disposed to be spaced apart from each other on the lower surface of the substrate 100.

The plurality of second coil electrodes 220 may be disposed in two pairs facing each other. For example, the 2-1 coil electrode 221 and the 2-4 coil electrode 224 may be disposed to face each other, and the 2-2 coil electrode 222 and the 2-3 coil electrode 223 may be disposed to face each other.

The 2-1 coil electrode 221 and the 2-4 coil electrode 224 may be connected to a first wiring electrode 410 and a fourth wiring electrode 440 on the lower surface of the substrate 100, respectively.

In addition, the 2-2 coil electrode 222 and the 2-3 coil electrode 223 may be connected to a second wiring electrode 420 and a third wiring electrode 430 on the lower surface of the substrate 100, respectively.

The first coil electrode 210 and the second coil electrode 220 may be disposed at positions corresponding to each other on the upper and lower surfaces of the substrate 100.

That is, the 1-1 coil electrode 211 and the 2-1 coil electrode 221 may be disposed at positions corresponding to each other on the upper and lower surfaces of the substrate 100. In addition, the 1-2 coil electrode 212 and the 2-2 coil electrode 222 may be disposed at positions corresponding to each other on the upper and lower surfaces of the substrate 100. Further, the 1-3 coil electrode 213 and the 2-3rd coil electrode 223 may be disposed at positions corresponding to each other on the upper and lower surfaces of the substrate 100. Furthermore, the 1-4 coil electrode 214 and the 2-4 coil electrode 224 may be disposed at positions corresponding to each other on the upper and lower surfaces of the substrate 100.

That is, the coil electrodes disposed on the upper and lower surfaces of the substrate 100 may be disposed at the positions corresponding to each other on the upper and lower surfaces of the substrate 100, and may be disposed at positions overlapping each other in a thickness direction of the substrate.

Referring to FIGS. 4 and 5, the first coil electrode 210 and the second coil electrode 220 may be wound in one direction while having a plurality of bent regions. Accordingly, the first coil electrode 210 and the second coil electrode may be formed in a coil pattern shape as a whole. For example, pattern electrodes of the first coil electrode 210 and the second coil electrode may be formed as coil-shaped electrodes while being wound in one direction from the outside toward the inside or from the inside toward the outside.

The first coil electrode 210 and the second coil electrode 220 change magnetic flux due to a change in current to generate an electromotive force. The magnetic flux generated by the first coil electrode 210 and the second coil electrode 220 may be proportional to inductance and a flowing current as shown in the following equations. Further, the electromotive force may be affected by resistance of a circuit, and as a cross-sectional area of the first coil electrode 210 and the second coil electrode 220 increases, the resistance may be reduced.

$$\Phi = L1 \quad (1)$$

$$L = \mu N2 A / l \quad (2)$$

$$Resistance = 1/conductivity * A \quad (3)$$

(In Equations 1 to 3, it is defined that $\Phi$ is magnetic flux, L is inductance, N is the number of coil electrodes wound, l is a length of a coil, and A is an area (line width*thickness of a coil electrode))

That is, the cross-sectional area of the first coil electrode 210 and the second coil electrode 220 should be increased in order to reduce the resistance of the circuit, and line widths and thicknesses of the first coil electrode 210 and the second coil electrode 220 should be increased in order to increase the cross-sectional area of the first coil electrode 210 and the second coil electrode 220.

Meanwhile, after a photosensitive pattern formed of a photosensitive film is formed on the substrate 100, the first coil electrode 210 and the second coil electrode 220 may be formed between the photosensitive patterns in a certain thickness through an electrolytic or electroless plating process.

The first coil electrode 210 and the second coil electrode 220 may include a metal material having excellent electrical conductivity. In more detail, the first coil electrode 210 and the second coil electrode 220 may include copper (Cu). However, the embodiment is not limited thereto, and the first coil electrode 210 and the second coil electrode 220 may include at least one metal of copper (Cu), aluminum (Al), chromium (Cr), nickel (Ni), silver (Ag), molybdenum (Mo), gold (Au), titanium (Ti), and alloys thereof.

The first coil electrode 210 and the second coil electrode 220 may be disposed to have thicknesses T1 and T2 of 20 μm to 60 μm. In detail, the first coil electrode 210 and the second coil electrode 220 may be disposed to have a thickness of 30 μm to 50 μm. In more detail, the first coil electrode 210 and the second coil electrode 220 may be disposed to have a thickness of 35 μm to 45 μm.

When the thickness of the first coil electrode 210 and the second coil electrode 220 is less than 20 μm, resistance of the first coil electrode 210 and the second coil electrode 220 may increase. When the thickness of the first coil electrode 210 and the second coil electrode 220 exceeds 60 μm, it may be difficult to implement a fine pattern.

In addition, the first coil electrode 210 and the second coil electrode 220 may be disposed to have line widths W1 and W2 of 10 μm to 30 μm. In detail, the first coil electrode 210 and the second coil electrode 220 may have line widths of 12 μm to 27 μm. In more detail, the first coil electrode 210 and the second coil electrode 220 may have line widths of 15 μm to 25 μm.

When the line widths of the first coil electrode 210 and the second coil electrode 220 are less than 10 μm, the resistance of the first coil electrode 210 and the second coil electrode 220 may increase. When the line widths of the first coil electrode 210 and the second coil electrode 220 exceed 30 μm, it may be difficult to implement a fine pattern.

In addition, the first coil electrode 210 and the second coil electrode 220 may be disposed at distances S1 and S2 of 5 μm to 15 μm. In detail, the first coil electrode 210 and the second coil electrode 220 may be disposed at distances of 7 μm to 13 μm. In more detail, the first coil electrode 210 and the second coil electrode 220 may be disposed at distances of 9 μm to 11 μm.

When a distance between the first coil electrode 210 and the second coil electrode 220 is formed to be less than 5 μm, when the first coil electrode 210 and the second coil electrode 220 are formed, as the photosensitive pattern collapses due to a decrease in line width of the photosensitive pattern, the pattern electrodes of the coil electrodes are short-circuited with each other, so that the line width of each pattern electrode of each coil electrode may be non-uniform. In addition, when the distance between the first coil electrode 210 and the second coil electrode 220 is formed to exceed 15 μm, a line length of the first coil electrode 210 and the second coil electrode 220 may be increased as a whole.

Meanwhile, in the first coil electrode 210 and the second coil electrode 220, in order to make a plating thickness of the pattern electrodes, that is, the thicknesses T1 and T2 of each of the pattern electrodes of the first coil electrode 210 and the second coil electrode 220 uniform, the dummy electrode 500 may be formed outside the first coil electrode 210 and the second coil electrode 220.

That is, a plurality of dummy electrodes 500 spaced apart from the first coil electrode 210 and the second coil electrode 220 may be disposed outside and inside the first coil electrode 210 and the second coil electrode 220.

That is, the dummy electrode may not be electrically connected to the first coil electrode 210 and the second coil electrode 220.

The dummy electrodes 500 may include a plurality of third pattern electrodes. That is, the dummy electrode 500 may include the plurality of third pattern electrodes spaced apart from each other.

The third pattern electrodes may partially extend in the same direction as a direction in which the first pattern electrode and/or the second pattern electrode extend. Alternatively, the third pattern electrodes may extend in a direction different from the direction in which the first pattern electrode and/or the second pattern electrode extend.

The dummy electrode 500 may serve to make the plating thickness of each of the pattern electrodes of the first coil electrode 210 and the second coil electrode 220 uniform.

In detail, when only the photosensitive pattern for forming the first coil electrode 210 and the second coil electrode 220 is formed on the substrate 100, it may be difficult to uniformly control the plating thickness of the pattern electrodes of the first coil electrode 210 and the second coil electrode 220 as a whole. Accordingly, a photosensitive pattern of a patterned electrode forming a dummy electrode in addition to the pattern electrodes of the first coil electrode 210 and the second coil electrode 220 may be formed to make an area on which each region of the substrate is plated uniform. Therefore, the plating thickness of the pattern electrodes of the first coil electrode 210 and the second coil electrode 220 may be uniform.

That is, the dummy electrode 500 may be partially or entirely formed in a region other than the region in which the first coil electrode 210 and the second coil electrode 220 are formed.

FIG. 6 is a cross-section view taken along line A-A' in FIG. 4, FIG. 7 is a cross section view taken along line B-B' in FIG. 5, and FIG. 8 is a view showing cross sections of the upper and lower portions of the substrate together.

Referring to FIGS. 6 to 8, the first coil electrode 210 including a plurality of first pattern electrodes 201 may be disposed on the upper surface of the substrate 100, and the second coil electrode 220 including a plurality of second pattern electrodes 202 may be disposed on the lower surface of the substrate 100.

In addition, the dummy electrode 500 disposed between the first pattern electrodes 201 or outside the first pattern electrodes 201 and including a 3-1 pattern electrode 501 may be disposed on the upper surface of the substrate 100.

In addition, the dummy electrode 500 disposed between the second pattern electrodes 202 or outside the second pattern electrodes 202 and including a 3-2 pattern electrode 502 may be deployed on the lower surface of the substrate 100.

Referring to FIGS. 6 and 8, a distance s1 between the first pattern electrodes 201, a distance s3 between the 3-1 pattern electrodes 501, and a distance s4 between the first pattern electrode 201 and the 3-1 pattern electrode 501 may be different from each other.

In detail, the distance s1 between the first pattern electrodes 201 and the distance s3 between the 3-1 pattern electrodes 501 may be the same as or similar to each other. In addition, the distance s1 between the first pattern electrodes 201 and the distance s3 between the 3-1 pattern electrodes 501, and the distance s4 between the first pattern electrode 201 and the 3-1 pattern electrode 501 may be different from each other.

In detail, the distance s1 between the first pattern electrodes 201 and the distance s3 between the 3-1 pattern electrodes 501 may be greater or smaller than the distance between the first pattern electrode 201 and the 3-1 pattern electrode 501.

That is, the distance s1 between the first pattern electrodes 201 and the distance between the 3-1 pattern electrodes 501 may be a greater or smaller than the distance s4 between the first pattern electrode 201 and the 3-1 pattern electrode 501.

For example, the distance s4 between the first pattern electrode 201 and the 3-1 pattern electrode 501 may be 3 μm to 1000 μm. A range of the distance s4 between the first pattern electrode 201 and the 3-1 pattern electrode 501 may be a range set in consideration of a thickness and reliability of the first pattern electrode 201. In detail, when the distance s4 between the first pattern electrode 201 and the 3-1 pattern electrode 501 is less than 3 μm, the line width of the photosensitive pattern between the first pattern electrode 201 and the 3-1 pattern electrode is formed too small, and thus the photosensitive pattern may be collapsed. When the photosensitive pattern is collapsed, the first pattern electrode 201 and the 3-1 pattern electrode 501 are in contact with each other, so that the line widths of the first pattern electrodes 201 may be non-uniform, and the role of the dummy electrode pattern may not be sufficiently performed.

In addition, when the distance s4 between the first pattern electrode 201 and the 3-1 pattern electrode 501 exceeds 1000 μm, the distance between the first pattern electrode 201 and the 3-1 pattern electrodes 501 is too large, and accordingly, a region in which plating is performed in the area of the substrate is non-uniform, so that the thickness of the first pattern electrodes 201 may be non-uniform.

In addition, referring to FIGS. 7 and 8, a size of a distance s2 between the second pattern electrodes 202, a distance s3' between the 3-2 pattern electrodes 502, and a distance s4' between the second pattern electrode 202 and the 3-2 pattern electrode 502 may be different from each other.

In detail, the distance s2 between the second pattern electrodes 202 and the distance s3' between the 3-2 pattern electrodes 502 may be the same as or similar to each other. In addition, the distance s2 between the second pattern electrodes 202 and the distance s3' between the 3-2 pattern electrodes 502, and the distance s4' between the second pattern electrode 202 and the 3-2 pattern electrode 502 may be different from each other.

In addition, the distance s3 between the 3-1 pattern electrodes 501 and the distance s3' between the 3-2 pattern electrodes 502 may be the same as each other or different from each other.

In addition, the distance s4 between the first pattern electrode 201 and the 3-1 pattern electrode 501 and the distance s4' between the second pattern electrode 202 and the 3-2 pattern electrode 502 may be the same as each other or different from each other.

In detail, the distance s2 between the second pattern electrodes 202 and the distance s3' between the 3-2 pattern electrodes 502 may be greater or smaller than the distance s4' between the second pattern electrode 202 and the 3-2 pattern electrode 502.

That is, the distance s2 between the second pattern electrodes 202 and the distance between the 3-2 pattern electrode 502 may be a greater or smaller distance than the distance s4' between the second pattern electrode 202 and the 3-2 pattern electrode 502.

For example, the distance s4' between the second pattern electrode 202 and the 3-2 pattern electrode 502 may be 3 μm to 1000 μm. A range of the distance s4' between the second pattern electrode 202 and the 3-2 pattern electrode 502 may be a range set in consideration of a thickness and reliability of the second pattern electrode 202. In detail, when the distance s4' between the second pattern electrode 202 and the 3-2 pattern electrode 502 is less than 3 µm, the line width of the photosensitive pattern between the second pattern electrode 202 and the 3-2 pattern electrode 502 is formed too small, and thus the photosensitive pattern may be collapsed. When the photosensitive pattern is collapsed, the second pattern electrode 202 and the 3-2 pattern electrode 502 are in contact with each other, so that the line widths of the second pattern electrodes 202 may be non-uniform, and the role of the dummy electrode pattern may not be sufficiently performed.

In addition, when the distance s4 between the second pattern electrode 202 and the 3-2 pattern electrode 502 exceeds 1000 µm, the distance between the second pattern electrode 202 and the 3-2 pattern electrode 502 is too large, and accordingly, the region in which plating is performed in the area of the substrate is non-uniform, so that the thickness of the second pattern electrodes 202 may be non-uniform.

Meanwhile, referring to FIG. 8, the first pattern electrode 201 and the second pattern electrode 202 disposed on the upper and lower surfaces of the substrate 100 may be connected to each other through a conductive material 250 filled in a via hole formed in the substrate 100. Accordingly, the first coil electrode 210 disposed on the upper surface of the substrate and the second coil electrode 220 disposed on the lower surface of the substrate may be electrically connected to each other.

The coil member according to the embodiment may include the dummy electrode together with the coil electrode that generates electromotive force.

Accordingly, when forming an electrode pattern by a plating process by patterning the coil electrode, the thickness of each of the electrode patterns may be uniformly formed. That is, the plating thickness of the electrode patterns may be uniform by forming a thickness of a region to be plated in a region of the substrate uniform as a whole.

In addition, a distance between the coil electrode pattern and the dummy electrode pattern may be controlled within a predetermined range. Accordingly, dummy electrode patterns may be stably formed, so that the plating thickness of the coil electrode patterns may be uniform by the dummy electrode patterns.

Therefore, it is possible to sufficiently secure the thickness of the coil pattern of the coil member that serves to prevent camera shake of the camera module according to the embodiment, so that it is possible to reduce the resistance of the coil member, and accordingly, it is possible to sufficiently generate the electromotive force of the coil member, thereby improving characteristics of the coil member and anti-shake characteristics of the camera module including the same.

Meanwhile, FIG. 9 is a cross-section view taken along line C-C' in FIG. 2, FIG. 10 is a cross-section view taken along line D-D' in FIG. 3, and FIG. 11 is a view showing cross sections of the upper and lower portions of the substrate together.

Referring to FIGS. 9 to 11, as described above, the first region 1A in which the first coil electrode and the second coil electrode are disposed and the second region 2A passing through the substrate 100 may be formed the substrate 100.

That is, the 1-1 coil electrode 211 and the 1-4 coil electrode 214 or the 1-2 coil electrode 212 and the 1-3 coil electrode 213 may be disposed so as to face each other while being spaced apart from each other by the second region 2A.

In addition, the 2-1 coil electrode 221 and the 2-4 coil electrode 224 or the 2-2 coil electrode 222 and the 2-3 coil electrode 223 may be disposed so as to face each other while being spaced apart from each other by the second region 2A.

Meanwhile, FIG. 12 is a cross-section view taken along line E-E' in FIG. 2, FIG. 13 is a cross-section view taken along line F-F' in FIG. 3, and FIG. 14 a view showing cross sections of the upper and lower portions of the substrate together.

Referring to FIGS. 12 to 14, different electrodes may be disposed on the upper and lower surfaces of the substrate 100.

In detail, a plurality of wiring electrodes 400 may be disposed only on the lower surface of the substrate 100.

The wiring electrode 400 may include a material the same as or similar to that of the first coil electrode, the second coil electrode, and the dummy electrode. In detail, the wiring electrode 400 may include copper (Cu). However, the embodiment is not limited thereto, and the first coil electrode 210 and the second coil electrode 220 may include at least one metal of copper (Cu), aluminum (Al), chromium (Cr), nickel (Ni), silver (Ag), molybdenum (Mo), gold (Au), titanium (Ti), and alloys thereof.

In addition, a surface treatment layer 401 may be further disposed on an outer surface of the wiring electrode 400. In detail, the surface treatment layer 401 disposed to surround the wiring electrode 400 may be disposed on the outer surface of the wiring electrode 400.

The surface treatment layer 401 may include tin (Sn). When the surface treatment layer is formed on the outer surface of the wiring electrode, since corrosion resistance of tin (Sn) is excellent, reliability of the coil member may be improved by preventing oxidation of the wiring electrode 400.

The characteristics, structures and effects described in the embodiments above are included in at least one embodiment of the present invention but are not necessarily limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

In addition, embodiments are mostly described above, but the embodiments are merely examples and do not limit the present invention, and those of ordinary skill in the art to which the present invention pertains may appreciate that various modifications and applications not illustrated above may be made without departing from the essential characteristic of the embodiments. For example, each component specifically represented in the embodiments may be varied. In addition, it should be construed that differences related to such modifications and such applications are included in the scope of the present invention defined in the following claims.

The invention claimed is:

1. A coil member comprising:
   a substrate including an upper surface and a lower surface opposite to the upper surface;
   a first coil electrode disposed on the upper surface of the substrate and including a first pattern electrode;
   a second coil electrode disposed on the lower surface of the substrate and including a second pattern electrode; and
   a third pattern electrode disposed on the upper and lower surfaces of the substrate,
   wherein a distance between the first pattern electrodes and a distance between the first pattern electrode and the third pattern electrode are different from each other, a distance between the second pattern electrodes and a distance between the second pattern electrode and the third pattern electrode are different from each other, and wherein at least one of a distance between the first pattern electrode and the third pattern electrode and a distance between the second pattern electrode and the third pattern electrode is 3 μm to 1000 μm.

2. The coil member of claim 1 wherein the third pattern electrode is disposed at least one position between a plurality of first pattern electrodes, between a plurality of second pattern electrodes, an outside of the plurality of first pattern electrodes, and an outside of the second pattern electrode.

3. The coil member of claim 1, wherein the third pattern electrode extends in a direction that is the same as or different from that of at least one of the first pattern electrode and the second pattern electrode.

4. The coil member of claim 1, wherein a via hole is formed in the substrate, and
the first coil electrode and the second coil electrode are electrically connected to each other by a conductive material disposed in the via hole.

5. The coil member of claim 1, further comprising a wiring electrode disposed on the lower surface of the substrate,
wherein the second coil electrode is electrically connected to the wiring electrode.

6. The coil member of claim 1, wherein the third pattern electrode is not electrically connected to the first pattern electrode and the second pattern electrode.

7. The coil member of claim 1, wherein the substrate includes a through-hole.

8. The coil member of claim 1, wherein the first coil electrode and the second coil electrode are disposed at positions overlapping each other in a thickness direction of the substrate.

9. The coil member of claim 1, wherein the first coil electrode and the second coil electrode include copper.

10. The coil member of claim 1, wherein the third pattern electrode is a dummy electrode.

11. The coil member of claim 1, wherein the distance between the first pattern electrodes and the distance between the third pattern electrodes are smaller than the distance between the first pattern electrode and the third pattern electrode.

12. The coil member of claim 1, wherein the distance between the first pattern electrodes and the distance between the third pattern electrodes are greater than the distance between the first pattern electrode and the third pattern electrode.

13. The coil member of claim 1, wherein the distance between the second pattern electrodes and the distance between the third pattern electrodes are smaller than the distance between the second pattern electrode and the third pattern electrode.

14. The coil member of claim 1, wherein the distance between the second pattern electrodes and the distance between the third pattern electrodes are greater than the distance between the second pattern electrode and the third pattern electrode.

15. A coil member comprising:
a substrate including an upper surface and a lower surface opposite to the upper surface;
a first coil electrode disposed on the upper surface of the substrate and including a first pattern electrode;
a second coil electrode disposed on the lower surface of the substrate and including a second pattern electrode; and
a third pattern electrode disposed on the upper and lower surfaces of the substrate,
wherein a distance between the first pattern electrodes and a distance between the first pattern electrode and the third pattern electrode are different from each other, and
a distance between the second pattern electrodes and a distance between the second pattern electrode and the third pattern electrode are different from each other, and
wherein a thickness of at least one of the first coil electrode and the second coil electrode is 20 μm to 60 μm.

16. The coil member of claim 15, wherein a line width of at least one of the first coil electrode and the second coil electrode is 10 μm to 30 μm.

17. The coil member of claim 16, wherein a distance of at least one of the first coil electrode and the second coil electrode between 5 μm and 15 μm.

18. A camera module comprising:
a first mover disposed on a side surface of a lens unit to move the lens unit;
a second mover positioned on a side surface of the first mover to face the first mover;
a stator positioned opposite to a lower side of the second mover to move the second mover, and having a through-hole corresponding to the lens unit formed at a center thereof; and
a base supporting the stator and the second mover, and having a hollow hole corresponding to the through-hole of the stator formed in a center thereof,
wherein the stator includes a circuit board and a coil member disposed on the circuit board, and
wherein the coil member includes:
a substrate including an upper surface and a lower surface opposite to the upper surface;
a first coil electrode disposed on the upper surface of the substrate and including a first pattern electrode;
a second coil electrode disposed on the lower surface of the substrate and including a second pattern electrode; and
a third pattern electrode disposed on the upper and lower surfaces of the substrate,
wherein a distance between the first pattern electrodes and a distance between the first pattern electrode and the third pattern electrode are different from each other,
a distance between the second pattern electrodes and a distance between the second pattern electrode and the third pattern electrode are different from each other, and
the distance between the first pattern electrode and the third pattern electrode and the distance between the second pattern electrode and the third pattern electrode are 3 μm to 1000 μm.

\* \* \* \* \*